Feb. 16, 1932.  A. F. WILLAT ET AL  1,845,692

LIQUID HEATING AND CIRCULATING DEVICE

Filed Aug. 27, 1931

INVENTORS.
Arnold F. Willat
James B. Dawson
BY Joseph B. Gardner
ATTORNEY.

Patented Feb. 16, 1932

1,845,692

UNITED STATES PATENT OFFICE

ARNOLD F. WILLAT, OF SAN RAFAEL, AND JAMES B. DAWSON, OF SAN FRANCISCO, CALIFORNIA

LIQUID HEATING AND CIRCULATING DEVICE

Application filed August 27, 1931. Serial No. 559,744.

The invention relates to a device arranged for immersion in a liquid, such as oil or the like, for the purpose of effecting simultaneously the heating and circulation thereof while contained in a storing or other vessel not particularly adaptable for external heat application.

An object of the invention is to provide a device which has combined therein as a single and compact unitary structure, the means for heating the liquid and the means including the motor for effecting the circulation of the liquid.

Another object of the invention is to provide a device of the character described which may be readily supported on the cover of the vessel with the parts arranged for immersion in the liquid extended through a substantially sealed opening in such cover.

A further object of the invention is to provide a device of the character described in which the bung or cap for sealing the opening in the vessel cover forms a unitary part of the device and serves as the sole means of supporting same in operative position on the cover.

A still further object of the invention is to provide a device of the character described in which an electric resistance connected in series with the motor for diminishing the speed thereof is associated with the electric element for heating the liquid so that such resistance may be used in substantially the same manner as the element for effecting the heating of the liquid.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
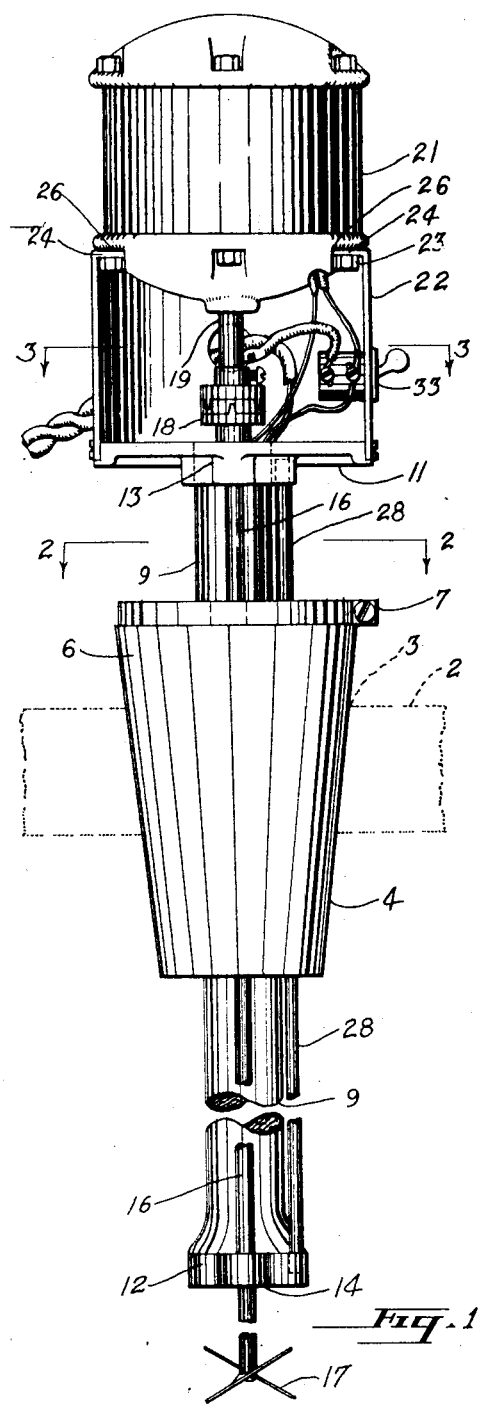
Figure 1 is a side elevation of the unit of our invention.
Figure 4:
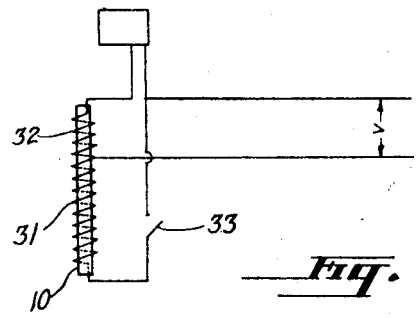
Figure 4 is a diagrammatic representation of the electrical circuit as used in the device.

As illustrated in the drawings the device of our invention is designed for operative positioning on a closed vessel or receptacle such as a drum or barrel for oil or the like, having a suitable top or cover 2 as indicated in dotted lines. The cover as here shown is formed with an opening 3 which is arranged to be sealed with a bung or a cap depending on the construction of the vessel cover. In the present embodiment the device is structurally combined with a bung 4 formed of wood and tapered so as to fit tightly within the correspondingly shaped opening 3. The bung is split longitudinally so as to provide a pair of transversely separable sections or halves 5 and 6 which are arranged to be held together by means of a clamp 7.

Extending longitudinally through the bung in an opening 8 defined by the two halves 5 and 6 is a tube 9 sealed at the bottom and arranged to contain an electrical heating element core 10 lying lengthwise in the central and lower portion of the tube. The tube is secured at its upper and lower extremities to headers 11 and 12 respectively, and as clearly shown in Figure 1 such headers provide bearings 13 and 14 for a power shaft 16 which extends through the bung in parallel relation with the tube 9 and has affixed to the lower extremity thereof a propeller 17.

The upper end of shaft 16 is connected by means of a coupling 18 to a shaft 19 of a motor 21, which is supported on a semi-cylindrical casing or shell 22 extending upwardly from and fixed to the header 11. Attachment of the motor to the shell 22 is preferable by means of the screw bolts 23 which secure the motor parts together and clamp threagainst the perforated ears 24 formed on the shell and arranged to seat within the nut receiving depressions 26 provided on the motor casing.

Figure 2:
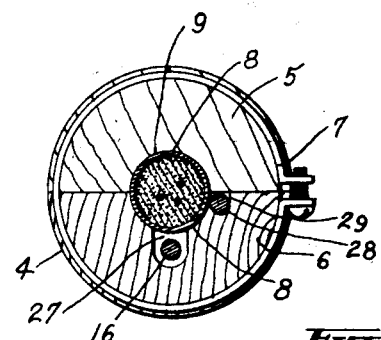
Figure 2 is a transverse sectional view of the device taken through the electric heating element casing, the plane of the section being indicated by the line 2—2 of Figure 1.
Figure 3:
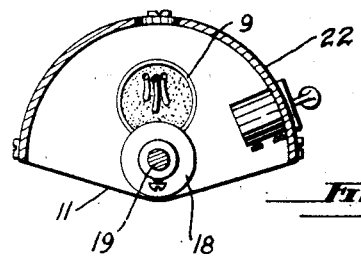
Figure 3 is a transverse sectional view of the device taken on the line 3—3 of Figure 1.

As will be clear from Figure 2 the bung section through which the propellor shaft extends is formed with a groove 27 preferably at the side of opening 8 and serving for the reception of said shaft. The groove is relatively large so that ample clearance will be afforded between shaft and the portion of the bung surrounding same. In order to retain the shaft free within the groove and at the same time prevent the rotation of the tube in the bung, a guide rod 28 is secured to the headers and interposed therebetween in parallel relation to the shaft and tube. The rod 28 is designed to fit snugly in a groove 29 of the bung and be firmly locked therein when the bung sections are clamped together, thereby serving to effectively hold the tube and shaft from revolving together when the device is being operated.

Any suitable type of electric heating element such as a coil 31 may be positioned on the core 10 for heating the liquid in the vessel, and in the present embodiment of the invention a second coil 32 or the like is disposed on the core and which, in addition to serving as a resistance element for slowing up the speed of the motor, supplements the element 31 in serving in a substantially like heating capacity as a means of heating the liquid. It will thus be clear that while a resistance is added to avoid the necessity of using an expensive motor winding or a reduction gearing for obtaining a slow motor or driving speed, the heat generated in the use of such resistance is utilized practically entirely in effecting the heating of the liquid, thereby making possible the use of a simple and inexpensive motor without loss of efficiency. The resistance coil as will be seen in the drawings is arranged in series with the motor so that when the motor is operating the coil is always in action. On the other hand, the coil 31 is arranged in parallel with the motor and may be operated or not, during the operation of the motor, as may be desired, a switch 33 being arranged in the circuit branch of the coil to allow such optional operation. As shown in Figure 1, the switch 33 is mounted on the supporting shell 22, and the leads to and from the switch as well as those between the motor and coils are arranged out of the way within the shell.

To apply our device to the vessel, it is merely necessary to remove the original bung or cap from the opening and replace same with the bung 4 and associated parts of the unit. The tube, shaft, etc., may be then raised or lowered relative to the bung or cover so as to immerse the heating element and propellor the desired depth in the liquid. Upon now forcing the bung down in tight engagement in the opening, the bung sections will be pressed together and against the tube and guide rod to firmly lock the entire unit in operative position. When the motor is then turned on with one or both heating elements, the liquid will be heated in an efficient manner while the propeller will effectively circulate the liquid throughout the entire vessel.

To remove the unit, it is merely necessary to loosen the bung and then lift same out of the opening together with the rest of the unit.

We claim:

1. In a device of the character described, the combination with a cap for covering an opening in a vessel, of a heating element and power shaft adjustably carried thereby and connected together above and below said cap, said element being held in the cap against rotation, a motor for driving said shaft unitarily carried and adjustable therewith and with said element in said cap, and a liquid circulating means carried by said shaft below said cap.

2. In a device of the character described, the combination with a cap for covering an opening in a vessel top, of a tube encased electric heating element extending through said cap, a rotatable shaft extending substantially parallel with said element through said cap, independent means above and below said cap securing said element and shaft together and forming a bearing for said shaft, a motor for driving said shaft carried by said means above the cap and in concentric relation to the shaft, and a liquid circulating means carried by said shaft under the means below the cap, said shaft together with said element and propeller being insertible and withdrawable with said cap as a unit through said opening.

3. In a combined liquid heating and circulating device, a support, a tube adjustably secured in said support and having its lower end closed, a rotatable shaft extending parallel to said tube, independent means adjacent the upper and adjacent the lower extremity of the tube affixed thereto and providing a bearing for said shaft, a motor carried by the first means in axial alignment with the shaft and operatively coupled thereto, an electric heating element arranged within said tube and having the conductors therefor extending from the top of the tube, and blades affixed to said shaft below the lower extremity of the tube.

4. In a combined liquid heating and circulating device, the combination with a bung arranged for insertion in an opening and comprising transversely separable sections defining a bore, means for releasably securing said sections together, a tube slidably fitting in and extending through said bore and having its upper and lower extremities respectively open and closed, a rotatable shaft disposed parallel to said tube and extending through said bung substantially without engagement therewith, independent means at each of said extremities of the tube affixed thereto and providing bearings for the said shaft, a guide rod affixed to each of said bearing means and in parallel relation to said tube and slidably fitting in said bung, a motor secured to the upper of said bearing means in spaced relation to the upper end of the tube and with the shaft thereof in axial alignment with said first shaft, a coupling connecting said shafts, an electric heating element in said tube having the conductors therefor extending through the open end of the tube, an electric switch carried by said upper bearing motor supporting means, and a circulating means affixed to said first shaft and lying below the lower extremity of the tube.

In testimony whereof, we have hereunto set our hands at Oakland, California, this 24th day of August, 1931.

ARNOLD F. WILLAT.
JAMES B. DAWSON.